United States Patent [19]

Knowlton

[11] Patent Number: 4,689,155
[45] Date of Patent: Aug. 25, 1987

[54] METHOD FOR PURIFYING SOLIDS-STABILIZED EMULSIONS

[75] Inventor: Harold E. Knowlton, Moraga, Calif.

[73] Assignee: Chevron Research Company, San Francisco, Calif.

[21] Appl. No.: 586,908

[22] Filed: Mar. 9, 1984

Related U.S. Application Data

[63] Continuation of Ser. No. 527,586, Aug. 29, 1983, abandoned, which is a continuation-in-part of Ser. No. 414,138, Sep. 2, 1982, abandoned, which is a continuation of Ser. No. 177,154, Aug. 11, 1980, abandoned, which is a continuation-in-part of Ser. No. 138,472, Apr. 8, 1980, abandoned.

[51] Int. Cl.$^4$ ............... B01D 21/02; B01D 17/04
[52] U.S. Cl. .................... 210/708; 210/737; 210/770; 210/774; 210/805; 210/806
[58] Field of Search ............ 210/708, 737, 774, 800, 210/768, 805, 806, 770

[56] References Cited

U.S. PATENT DOCUMENTS

| | | | |
|---|---|---|---|
| 3,594,314 | 7/1971 | Bilhartz et al. | 210/804 |
| 3,707,464 | 12/1972 | Burns et al. | 210/737 |
| 4,123,357 | 10/1978 | Clements et al. | 210/800 |
| 4,170,551 | 10/1979 | Honour | 210/806 |

OTHER PUBLICATIONS

Knowlton, H. E. et al.; "Four Proven Cleanup Processes Pay Off in Refinery Operations"; Oil & Gas Journal, Jul. 9, 1979 Edition.
Bland, W. F. et al., eds.; "Petroleum Processing Handbook"; pub. McGraw-Hill, 1967; pp. 8-67 to 8-69.

*Primary Examiner*—Benoit Castel
*Attorney, Agent, or Firm*—S. R. La Paglia; W. K. Turner; E. A. Schaal

[57] ABSTRACT

Oil which is highly contaminated with water and particulate solids is purified by serial settling and recirculation steps, so that the amount of highly emulsified oil-water mixtures and highly dispersed solid mixtures is substantially reduced.

3 Claims, 1 Drawing Figure

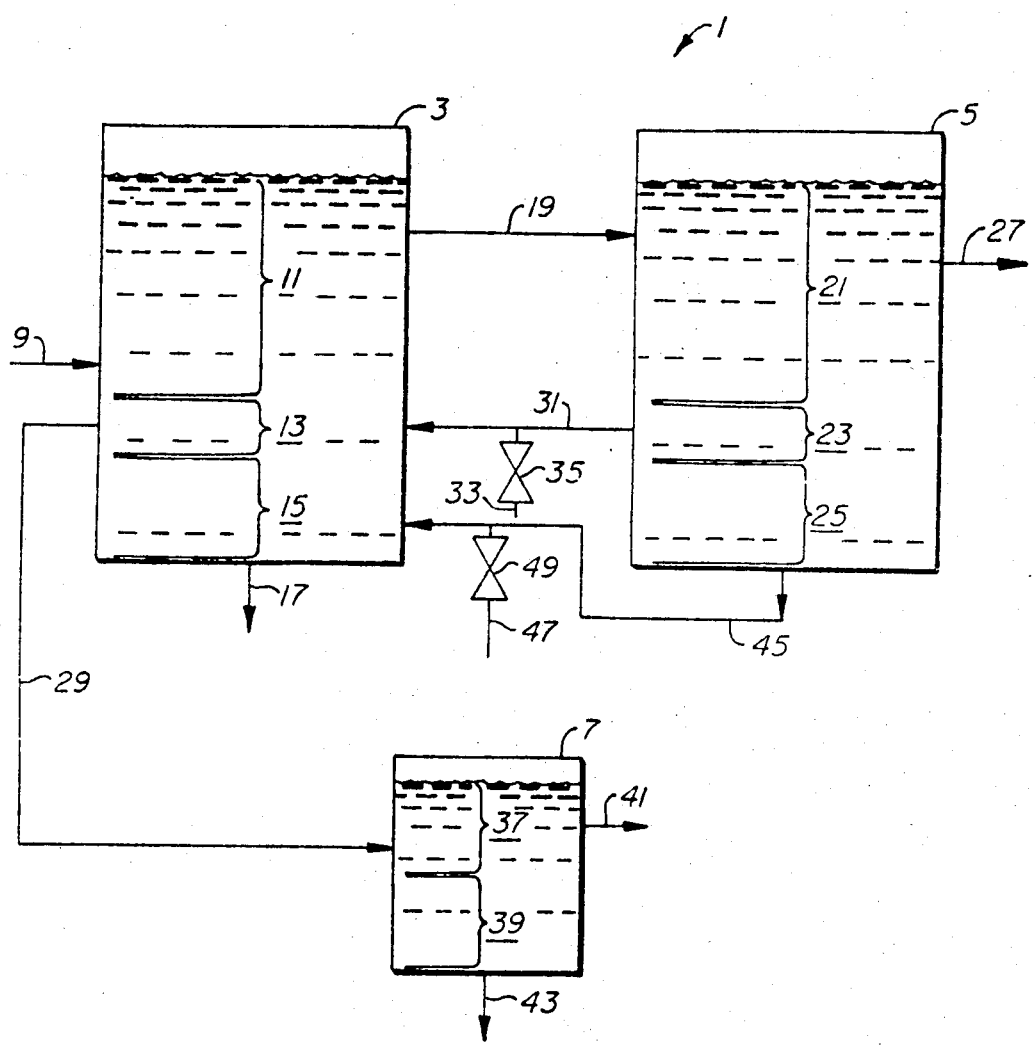

METHOD FOR PURIFYING SOLIDS-STABILIZED EMULSIONS

CROSS-REFERENCE TO RELATED APPLICATIONS

This application is a continuation of my copending application Ser. No. 527,586, filed on Aug. 29, 1983, now abandoned; which is a continuation-in-part of application Ser. No. 414,138, filed Sept. 2, 1982, now abandoned; which is a continuation of application Ser. No. 177,154, filed Aug. 11, 1980, now abandoned; which is a continuation-in-part of application Ser. No. 138,472, filed Apr. 8, 1980, now abandoned. The disclosures of each of these applications are incorporated herein by specific reference.

BACKGROUND OF THE INVENTION

This invention relates to a method for purifying contaminated oil which contains solids and water. More specifically, the present invention concerns purification of an oil contaminated with solids and water and which forms a solids-stabilized emulsion.

Oil streams contaminated with large amounts of particulate solids and emulsified water are formed during many petroleum refining operations. Common sources of such oil, sometimes termed "slop oil" are separation operations, desalting operations, other oil washing operations, equipment drainage and washing operations, froth from flotation type water purification, etc. The solids and water contained in such slop oil are sometimes referred to as bottoms sediments and water ("BS&W").

Oil which is contaminated with dispersed solids and emulsified water is usually treated by settling it in a large storage tank until it separates into an oil layer, an intermediate layer and a lower water layer. The intermediate layer, sometimes termed an "oil cuff", is a difficult to treat, stable emulsion of oil, water and particulate solids. Typically, simply settling contaminated oil in the conventional manner to provide the three layers, has the disadvantages of (1) requiring a relatively long period of settling to accomplish adequate separation of water and solids from the oil, (2) providing oil and water layers which are not as free from contaminants as is desired, and (3) resulting in formation of an overly large oil cuff layer containing too large a proportion of the original contaminated oil. Better separation has been attempted by heating the oil during settling and by adding demulsifiers to the oil; however, many contaminated oils contain solids-stabilized, oil-water emulsions which are quite difficult to break. The present invention is directed, in part, toward providing a more efficient and practical way to separate water and solids from contaminated oil.

SUMMARY OF THE INVENTION

In an embodiment, the present invention concerns a method for purifying oil contaminated with particulate solids and water, which comprises:
(a) settling said contaminated oil essentially without agitation in a first vessel, at a temperature of between 50° C. and 95° C., to form an upper partially purified oil layer, an intermediate first oil cuff layer including a solids-stabilized emulsion of oil and 5 to 80 weight percent of solids and water, and a lower first water layer, and withdrawing water from said first water layer;
(b) settling said partially purified oil essentially without agitation in a second vessel, at a temperature of between 50° C. and 95° C., to form an upper purified oil layer, an intermediate second oil cuff layer including a solids-stabilized emulsion of oil and 5 to 80 weight percent of solids and water, and a lower second water layer, and providing purified oil containing not more than 2 weight percent of solids and water from said purified oil layer; and
(c) settling said intermediate first and second oil cuff layers essentially without agitation in a third vessel, at a temperature between 50° C. and 95° C., to form an upper layer including oil and 5 to 80 weight percent of solids and water and a lower third water layer.

BRIEF DESCRIPTION OF THE DRAWING

The attached drawing is a schematic representation of a preferred embodiment of the present invention.

DETAILED DESCRIPTION OF THE INVENTION

The present invention is particularly adapted for purifying oil which is contaminated with water and solids. The invention is especially effective in purifying oil contaminated with bottoms sediments and water (BS&W) which is capable of forming solids-stabilized emulsions. Oil which has been recovered from equipment steaming and washing, equipment drainage, etc., is quite a suitable feed. So-called "slop" oils are quite suitable feeds.

Vessels which are suitable for use in carrying out the settling operations of the invention are those well known to those skilled in the art. Conventional oil storage tanks are preferred vessels.

Settling conditions employed in the present invention include holding the oil to be purified essentially without agitation at a relatively uniform temperature for a period of time sufficient to accomplish the desired degree of removal of water and solids from the oil.

PREFERRED EMBODIMENT

The present invention can best be described by referring to the preferred embodiment shown in the attached drawing. It will be understood, however, that the scope of the invention is not limited to the preferred embodiment shown. Various alternatives, modifications and equivalence of the depicted embodiment will be apparent to those skilled in the art, and such variations are within the scope of the invention.

Referring to the drawing, there is shown a contaminated oil purification system 1, which includes two larger storage-settling tanks 3 and 5 and a smaller storage-settling tank 7. Contaminated oil is introduced into the purification system through a conduit 9 and is passed into the tank 3. The contaminated oil is held in the tank 3 at a temperature of about 65° C. until it settles into three layers, or phases, an upper partially purified oil layer 11, an intermediate oil cuff layer 13, which contains oil and from about 5 to about 80 weight percent water plus particulate solids, and a lower, substantially solids-free water layer 15. Water is withdrawn from the tank 3 and passed out of the purification system through a conduit 17. Partially purified oil, usually containing more than 2 weight percent water and solids, is withdrawn from the tank 3 through a conduit 19, and is passed into the tank 5. The partially purified oil is held in the tank 5 at a temperature of about 65° C. until it settles into three layers, or phases, an upper purified oil layer 21, an intermediate oil cuff layer 23, which includes oil and from 5 to about 80 weight percent of water plus solids, and a lower, substantially solids-free water layer 25. Purified oil is recovered from the system through a conduit 27, and may be used in conventional petroleum refining operations or in any other convenient manner. Settling in the tanks 3 and 5 is continued until the purified oil removed through the conduit 27 contains not more than 2 weight percent of water and solids, combined. Preferably, settling is performed for a period sufficient to provide purified oil containing not more than 1 weight percent combined water and solids. Preferably, the contaminated oil is settled in the tank 3 for a period sufficient so that the partially purified oil removed from the tank 3 through the conduit 19 normally contains from about 2 to about 5 weight percent combined water and solids.

The intermediate layer 13 in the tank 3 is removed and passed through a conduit 29 into the tank 7. The intermediate layer 23 in the tank 5 is withdrawn into a conduit 31, or could be withdrawn with the bottom water phase to tanks. The material in the conduit 31 may, if desired, be passed directly into the tank 7 or directly into the conduit 29, (by means not shown) through the conduit 33, which is equipped with a valve 35. Preferably, however, the valve 35 is normally closed and the oil cuff layer material in the conduit 31 is normally introduced into the intermediate layer 13 in the tank 3. The material entering the tank 7 is settled to form an upper layer 37 containing oil and from about 5 to about 80 weight percent combined solids plus water, and a lower substantially solids-free water layer 39. The water-oil-solids material in the upper layer 37 is withdrawn from the vessel 7 and is passed out of the purification system through a conduit 41 for disposal or further separation by means not shown. Water is removed from the lower layer 39 and is passed out of the system through a conduit 43. The water layer in the tank 5 is withdrawn through a conduit 45. Water in the conduit 45 may, if desired, be passed directly out of the system through the conduit 47, which is equipped with the valve 49. Preferably, however, the valve 49 is normally shut, and water in the conduit 45 is passed into the lower water layer 15 in the tank 3.

A preferred embodiment of the present invention having been described, a variety of equivalents, modifications and alternative embodiments for the invention will be apparent. The scope of the invention as defined in the appended claims includes such modifications and alternatives.

What is claimed is:

1. A method for purifying oil contaminated with both solids and water capable of forming a solids-stabilized emulsion layer which comprises:
   (a) settling said contaminated oil essentially without agitation in a first vessel, at a temperature of between 50° C. and 95° C., to form an upper partially purified oil layer, an intermediate first oil cuff layer including a solids-stabilized emulsion of oil and 5 to 80 weight percent of solids and water, and a lower first water layer, and withdrawing water from said first water layer;
   (b) settling said partially purified oil essentially without agitation in a second vessel, at a temperature of between 50° C. and 95° C., to form an upper purified oil layer, an intermediate second oil cuff layer including a solids-stabilized emulsion of oil and 5 to 80 weight percent of solids and water, and a lower second water layer, and providing purified oil containing not more than 2 weight percent of solids and water from said purified oil layer; and
   (c) settling said intermediate first and second oil cuff layers essentially without agitation in a third vessel, at a temperature between 50° C. and 95° C., to form an upper layer including oil and 5 to 80 weight percent of solids and water and a lower third water layer.

2. A method according to claim 1 wherein said intermediate second oil cuff layer is passed from said second vessel into said intermediate first oil cuff layer in said first vessel.

3. A method according to claim 1 wherein said lower second water layer is passed from said second vessel into said lower first water layer in said first vessel.

* * * * *